United States Patent [19]

Lo

[11] Patent Number: 5,590,201
[45] Date of Patent: Dec. 31, 1996

[54] PROGRAMMABLE SOURCE ADDRESS LOCKING MECHANISM FOR SECURE NETWORKS

[75] Inventor: William Lo, Santa Clara, Calif.

[73] Assignee: Advanced Micro Devices Inc., Sunnyvale, Calif.

[21] Appl. No.: 337,634

[22] Filed: Nov. 10, 1994

[51] Int. Cl.$^6$ .................................................... H04L 9/00
[52] U.S. Cl. .............................. 380/49; 380/48; 370/911; 370/442; 370/248
[58] Field of Search ................................ 380/49, 48, 23, 380/25; 370/85.13, 60, 13.1

[56] References Cited

U.S. PATENT DOCUMENTS

| | | |
|---|---|---|
| 4,680,755 | 7/1987 | Reames . |
| 4,901,348 | 2/1990 | Nichols et al. . |
| 4,922,503 | 5/1990 | Leone ................................. 370/85.13 |
| 5,099,517 | 3/1992 | Gupta et al. . |
| 5,161,192 | 11/1992 | Carter et al. . |
| 5,177,788 | 1/1993 | Schanning et al. . |
| 5,179,554 | 1/1993 | Lomicka et al. . |
| 5,251,203 | 10/1993 | Thompson . |
| 5,353,353 | 10/1994 | Vijeh et al. . |
| 5,386,470 | 1/1995 | Carter et al. .............................. 380/48 |
| 5,485,455 | 1/1996 | Dobbins et al. .......................... 370/60 |

FOREIGN PATENT DOCUMENTS

0431751A1  6/1991  European Pat. Off. .

OTHER PUBLICATIONS

"Lecture Notes In Computer Science," Edited by Goos, G. and Hartmanis, J., Local Area Network Security, 055887566 Edited by Berson, T. A. and Beth, T., Workshop Lansec '89, E.I.S.S. Karlsruhe, FRG, Apr. 3–6, 1989, pp. 31–52.
"Information technology–Local and metropolitan area networks–Part 3: Carrier sense multiple access with collision detection (CSMA/CD) access method and physical layer specifications,"ISO/IEC 8802-3, ANSI/IEEE Std. 802.3, Fourth edition, 1993-07-08 (front page only).

Primary Examiner—David C. Cain
Attorney, Agent, or Firm—Townsend And Townsend And Crew LLP

[57] ABSTRACT

In a managed repeater having an address learn capability wherein receipt at a particular port of a data packet having a received source address different from a stored source address associated with the particular port replaces the stored source address with the received source address, a source address locking circuit includes an address learn circuit associated with the particular port, for replacing the stored source address with the received source address when the stored source address does not match the received source address, and an address lock register for the particular port, coupled to the address learn circuit, for storing a bit value to disable the address learn circuit from replacing the stored source address with the received source address. This managed repeater provides improved security in a network having source address updating by allowing an administrator to disable the source address update for a particular port in the managed repeater. Each address lock register is externally programmable, and the administrator is able to program time windows to disable source address updating for a particular port. The administrator may program each address lock register independently to prevent the stored source address associated with each port from being updated. The managed repeater allows the administrator to determine on a per port basis whether the managed repeater's address learning capability should be enabled or disabled for a programmable time window.

5 Claims, 2 Drawing Sheets

PROGRAMMABLE SOURCE ADDRESS LOCKING MECHANISM FOR SECURE NETWORKS

CROSS-REFERENCE TO RELATED APPLICATIONS

This application is related to "Address Tracking Over Repeater Based Networks", U.S. Pat. No. 5,414,694 issued May 9, 1995 and "Repeater Security System," U.S. Pat. No. 5,353,353 issued Oct. 4, 1994, both hereby expressly incorporated by reference for all purposes.

BACKGROUND OF THE INVENTION

The present invention relates to security for networks having source address updating, and more particularly to a programmable source address locking mechanism for secure networks.

In one typical network, such as a network based on the IEEE 802.3 standard (hereby incorporated by reference for all purposes), a data packet transmitted by one data terminal equipment (DTE), i.e., an end station, to another DTE passes through every repeater. Usually two or more end stations are connected to a repeater via the ports of the repeater. A repeater may also be connected to other repeaters.

A typical data packet includes a preamble, a start frame delimiter (SFD), a destination address field, a source address field, a type/length field, a data field, a frame check sequence (FCS) field, and an end transmission delimiter (ETD). Each DTE has an assigned individual, unique address referred to as a media access control (MAC) address. When a DTE transmits a data packet, the transmitted data packet contains the MAC address of the transmitting DTE in the source address field of the data packet and the MAC address of the DTE for which the data packet is intended in the destination address field of the data packet.

When a repeater receives a data packet on one of its ports from the DTE connected to that port, it retransmits the data packet unmodified to all the DTEs connected to the other ports. Usually, only the DTE whose MAC address is in the destination address field of the data packet reads the data packet, while the other DTEs simply ignore the data packet. However, the repeater's unmodified retransmission of the data packet to all the ports poses a threat to network security. Potentially, a non-targeted DTE having a MAC address that does not match the destination address contained in the destination address field could read a data packet intended only for the destination DTE.

Assuming that each port of the repeater is connected to one DTE (such as in a star topology network), it is possible for hardware within a management unit connected to the repeater to learn the MAC address of the DTE connected to each port. A repeater connected to such a management unit is referred to as a managed repeater having an address learn capability. The learned MAC address is stored within the management unit in a memory location ADR(x), where x is in the range of 1 to n, and x identifies the x port of n ports of the managed repeater.

With the exception of ports connected to multiple DTEs (i.e. stations on a coax cable, or another repeater), once the MAC address of the DTE connected to port x is known and stored in ADR(x), the value in ADR(x) never changes unless the network is reconfigured.

If the DTE at a managed repeater port does change, the management unit updates the stored MAC address for that port, in accordance with the IEEE 802.3 standard. Upon detecting a mismatch between a MAC address in the source address field of a data packet received at port x and a source address stored previously in ADR(x), the management unit updates the memory location ADR(x) by replacing the stored MAC address with the received source address included in the source address field of the received data packet.

Allowing updating of a learned MAC address exposes a network to a potentially serious breach in network security. For instance, an intruder could disconnect the DTE having a MAC address that was stored previously in ADR(x), and substitute a device by plugging it into port x. It is difficult in a secured network for an intruder attempting to use port x to know the MAC address previously stored in ADR(x), therefore the intruder most likely uses a different MAC address at port x. Once the intruder sends a data packet, and the managed repeater detects a different MAC address in the source address field of that data packet, the management unit replaces the previous learned MAC address with the intruder's MAC address. Thereafter, the intruder's address is stored in ADR(x), allowing the intruder access to the network. A more serious problem results from an intruder that causes ADR(x) to store a MAC address that corresponds to a different DTE on the network. The intruder will then receive data packets intended for the other DTE.

The prior art has dealt with this type of network security problem by setting an interrupt flag after a source address has been updated. The interrupt flags alerts a network administrator that a MAC address update occurred at the particular port. If the MAC address update is a result of an authorized DTE change, the administrator does not respond to the interrupt. If the change is not authorized, the administrator either shuts off the port or reprograms ADR(x) with the original learned MAC address before the next data packet arrives. An example of a managed repeater having an address learn capability that updates stored MAC addresses and sets an interrupt flag after updating to provide network security is the IMR+/HIMIB (P/N AM79C981 (IMR) and AM79C987 (HIMIB)), produced by Advanced Micro Devices of Sunnyvale, Calif. and described in the incorporated U.S. Pat. No. 5,353,353.

This type of network security system is sufficient provided the interrupt flag is timely serviced, but performance is not optimum in that the network security depends upon the speed of the microprocessor and efficient execution of complicated software in order to timely service the interrupt flag. Since thousands of data packets pass through the network every second, a security breach may be significant should data packets be transmitted to the intruder before the interrupt flag is serviced. Delays in servicing the interrupt allow the intruder, pretending to be another DTE, to eavesdrop on data packets destined for the DTE that it is mimicking. The prior art minimizes this type of security breach by using a very fast microprocessor and complicated software to service the high priority interrupt, but this solution is not desirable because the equipment is expensive.

In the prior art, a managed repeater having the learned address capability provided some degree of network security by corrupting the data packet transmitted to unauthorized ports and transmitting the uncorrupted data packet to the authorized port. That is, the managed repeater transmits the data packet unmodified on port x if the MAC address of the port x stored in ADR(x) matches the destination address of the received data packet. For all other ports with non-matching addresses, the managed repeater transmits a corrupted data packet on port x, thus preventing unauthorized DTEs from eavesdropping on a data packet destined for another DTE. An example of this kind of security system is described in the incorporated patent application Ser. No. 08/053,797. However, the prior art using destination address matching to corrupt data packets to unauthorized DTEs remains vulnerable to the security breach resulting from the source address updating scenario discussed earlier.

SUMMARY OF THE INVENTION

The present invention provides a mechanism for enhancing security in networks with managed repeaters having source address updating. The invention has various advantages over the prior art, including providing a more efficient and economical solution to a potential problem that source address updating poses to network security. The solution does not require a very fast microprocessor or complicated software as in the prior art.

According to one aspect of the invention, it operates in a managed repeater having an address learn capability wherein receipt at a particular port of a data packet having a received source address different from a stored source address associated with the particular port replaces the stored source address with the received source address. The preferred embodiment includes a source address locking circuit including an address learn circuit associated with the particular port, for replacing the stored source address with the received source address when the stored source address does not match the received source address, and an address lock register for the particular port, coupled to the address learn circuit, for storing a bit value to disable the address learn circuit from replacing the stored source address with the received source address.

The source address locking circuit provides improved security in a network having source address updating by allowing the administrator to disable the source address update for any particular port, or set of ports, in the managed repeater. Each address lock register is externally and individually programmable, and an administrator can program time windows to disable source address updating for a particular port as a function of time. The present invention allows the administrator to determine, on a per port basis, whether the managed repeater's address learning capability should be enabled or disabled for a programmable time window.

A further understanding of the nature and advantages of the invention may be realized by reference to the remaining portions of the specification and the drawings.

DESCRIPTION OF THE PREFERRED EMBODIMENT

Figure 1:
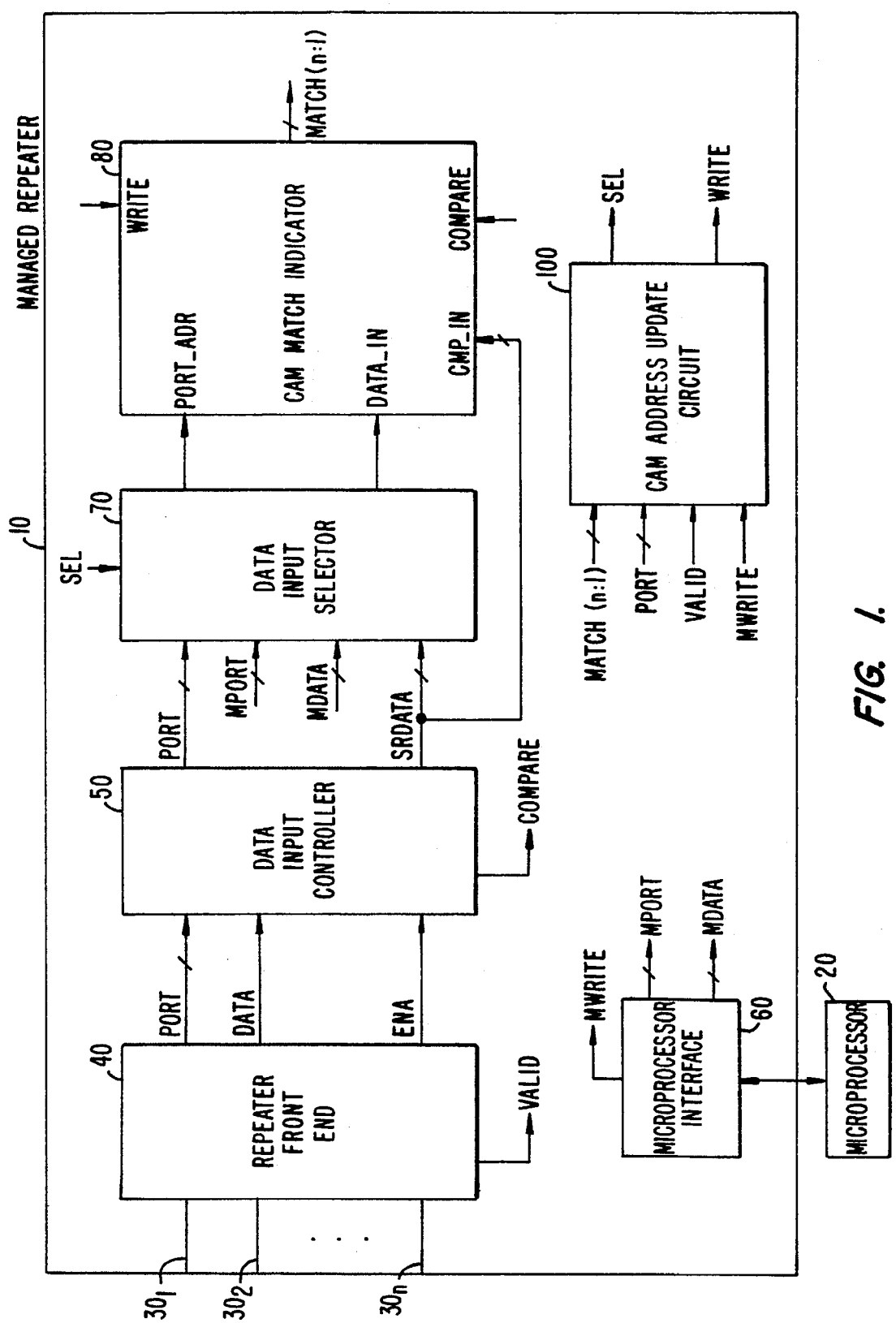
FIG. 1 is a block diagram of a managed repeater in accordance with the preferred embodiment of the present invention.

FIG. 1 is a block diagram of a managed repeater 10 coupled to a microprocessor 20. Managed repeater 10 includes a plurality of ports $30_x$, (x=1 to n), a repeater front end 40, a data input controller 50, a microprocessor interface 60, a data input selector 70, a content addressable memory (CAM) match indicator 80, and a CAM address update circuit 100.

A plurality of data terminal equipment (DTE) connects to managed repeater 10 via a plurality of ports $30_x$. On power up, managed repeater 10, having address learn capability, learns and stores each MAC address of the DTE connected at port $30_x$ in the associated address location ADR(x) in CAM match indicator 80. Managed repeater 10 updates a stored MAC address in ADR(x) with the received source address of the data packet received at port $30_x$, when the received source address at port $30_x$ is different from the stored MAC address in ADR(x).

Repeater front end 40 receives a data packet at port $30_1$ and retransmits the data packet to other ports $30_x$. Repeater front end 40 also processes the data packet to generate a PORT signal, a DATA signal, an ENABLE signal, and a VALID signal, to be used within managed repeater 10.

The PORT signal contains a 4-bit value that represents the port number associated with port $30_1$ receiving the data packet. The repeater front end 40 transmits the entire data packet in a serial bit stream. This serial bit stream contains the received source address of the data packet at port $30_1$. Assertion of the ENABLE signal indicates when data in the DATA signal is valid. The VALID signal is asserted to indicate the data packet is error free.

Data input controller 50 receives the PORT signal, the DATA signal, and the ENABLE signal from repeater front end 40. Data input controller 50 formats the DATA signal. Data input controller 50 includes a shift register and controller (not shown) for arranging bits of the received source address into a format appropriate for input to CAM match indicator 80. Data input controller 50 outputs the port number and the received source address in the proper format. After formatting, data input controller 50 asserts a COMPARE signal to CAM match indicator 80 to initiate a compare procedure.

Microprocessor interface 60, coupled to microprocessor 20, generates a microprocessor_data (MDATA) signal, a microprocessor_port (MPORT) signal, and a microprocessor_write (MWRITE) signal. The MDATA signal includes a MAC address that the microprocessor is programming into the ADR(x) memory location that corresponds to port $30_x$. The MPORT signal includes a port number identifying a port $30_x$, the MAC address of which the microprocessor is to program. Microprocessor interface 60 asserts the MWRITE signal to write the programmed MAC address and programmed port number to CAM match indicator 80.

Data input selector 70 is coupled to data input controller 50 and receives the port number and the received source address. Data input selector 70 also is coupled to microprocessor interface 60, and receives MPORT and MDATA. Responsive to a SELECT signal (SEL), two multiplexers (not shown, but included with data input selector 70) selects the port number and address from either data input controller 50 or microprocessor interface 60 as an input to CAM match indicator 80. Normally, the SELECT signal is set LOW so that data input selector 70 selects the programmed port number and address from microprocessor interface 60.

From data input selector 70, CAM match indicator 80 receives the selected port number at a PORT_ADR input and the corresponding selected address at a DATA_IN input. CAM match indicator 80 also receives the received source address, properly formatted, at a CMP_IN input.

CAM match indicator 80, responsive to an assertion of the COMPARE signal from data input controller 50, compares the received source address at CMP_IN with each of the MAC addresses stored in ADR(x) of CAM match indicator 80. In the preferred embodiment, there is one storage location ADR(x) for port $30_x$. Other embodiments may be implemented using multiple storage locations for each port, if desired, to account for multiple addresses connected to a port.

After comparing, CAM match indicator 80 asserts a MATCH(x) signal when the received source address at CMP_IN input matches a MAC address stored in ADR(x). CAM match indicator 80 has a plurality of MATCH(x) signals, one corresponding to each port $30_x$. For example, if the received source address from port $30_1$ matches the MAC address stored in ADR(2), CAM match indicator 80 asserts the MATCH(2) signal.

CAM match indicator 80, responsive to an assertion of a WRITE signal, writes the selected address information at DATA_IN input into memory location ADR(PORT_ADR) corresponding to the selected port number at PORT_ADR input.

Specific details regarding the operation and implementation of the above described functions within managed repeater 10 are further discussed in the incorporated U.S. Pat. No. 5,353,353 and in U.S. patent application Ser. No. 08/053,797.

CAM address update circuit 100 receives the PORT signal and the VALID signal from repeater front end 40, the plurality of MATCH(x) signals from CAM match indicator 80, and the MWRITE signal from microprocessor interface 60. Responsive to these signals, CAM address update circuit 100 sets the SELECT signal HIGH to data input selector 70 and the WRITE signal to CAM match indicator 80. CAM address update circuit 100 controls when to update a MAC address stored in CAM match indicator 80, as well as deciding whether the received source address or a programmed address replaces the stored MAC address corresponding to a particular port. The preferred embodiment operates within CAM address update circuit 100 to selectively disable MAC address updating.

Figure 2:
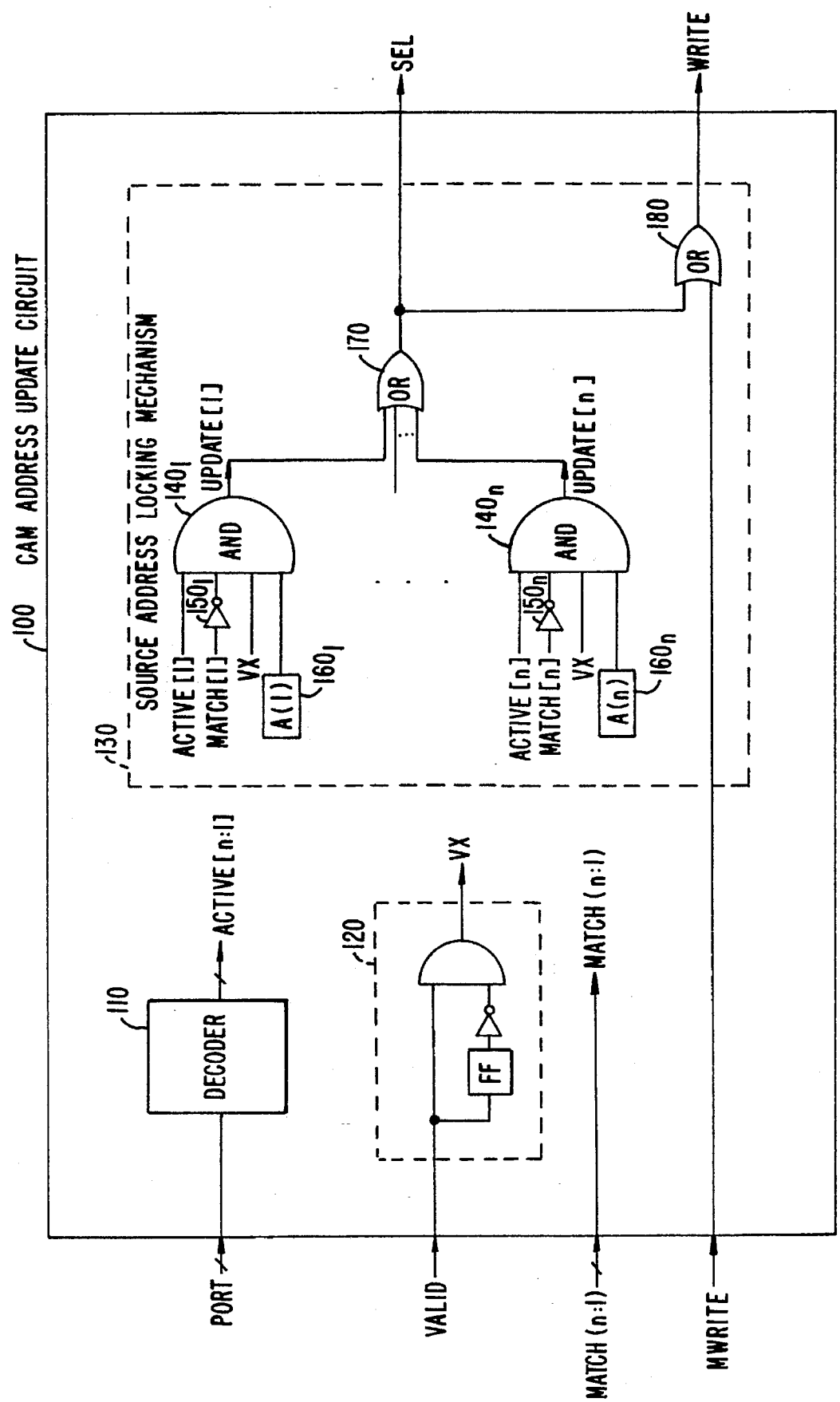
FIG. 2 is a detailed schematic block diagram of a CAM address update circuit.

FIG. 2 is a detailed schematic of CAM address update circuit 100. CAM address update circuit 100 includes a decoder 110, a pulse circuit 120, and a source address locking mechanism 130. Decoder 110 and pulse circuit 120 processes input signals for use by source address locking mechanism 130.

Decoder 110 decodes the PORT signal from repeater front end 40, and asserts a plurality of ACTIVE(x) signals, one ACTIVE(x) signal for each port $30_x$. The ACTIVE(x) signal is asserted when port $30_x$ is active, i.e., port $30_x$ has received a data packet. In the preferred embodiment, decoder 110 decodes the PORT signal and asserts only one ACTIVE signal when indicating that port $30_x$ received the data packet.

Pulse circuit 120 receives the VALID signal from repeater front end 40 to output a VX signal, a one-cycle pulse. Pulse circuit 120 asserts VX when the VALID signal transitions from LOW to HIGH. Repeater front end 40 asserts the VALID signal at the end of a data packet to indicate when the data packet is error free.

Source address locking mechanism 130 receives the ACTIVE(x) signals from decoder 110, the VX signal from pulse circuit 120, the MATCH(x) signals from CAM match indicator 80, and the MWRITE signal from microprocessor interface 60.

Source address locking mechanism 130 includes a plurality of AND gates $140_x$, a plurality of inverter gates $150_x$, a plurality of address lock registers $160_x$, a select OR gate 170, and a write OR gate 180.

For each port $30_x$, the ACTIVE(x) signal, an inverted MATCH(x) signal (output from inverter gate $150_x$ coupled to the MATCH(x) signal), and the VX signal, are coupled to input AND gate $140_x$. Address lock register A(x) $150_x$ is also coupled to an input of AND gate $140_x$. When address lock register A(x) is asserted, the ADR(x) for port $30_x$ is not locked and a stored MAC address for port x may be updated. When A(x) is deasserted, the UPDATE(x) signal will never assert, ensuring that ADR(x) is locked. Locking ADR(x) disables updating by a non-matching received source address.

In the preferred embodiment, address lock register A(x) $160_x$ is implemented as an internal register that is independently and externally programmable, allowing each port $30_x$ to be programmed differently. Other embodiments may implement address lock register A(x) differently. AND gate $140_1$ outputs an UPDATE(1) signal controlling an update of the ADR(1) location in CAM match indicator 80 with the received source address at port $30_1$.

The outputs of the plurality of AND gates $140_x$ are coupled to input of select OR gate 170. Select OR gate 170 asserts the SELECT signal to data input selector 70. Select OR gate 170 controls whether data input selector 70 selects between a programmed port number and address or a received port number and address at port $30_1$. The SELECT signal from select OR gate 170 is also coupled to an input of write OR gate 180. The MWRITE signal is also coupled to another input of write OR gate 180. Write OR gate 180 asserts the WRITE signal to CAM match indicator 80.

According to the preferred embodiment of the present invention, when VX is asserted indicating an error free packet was received), and ACTIVE(1) is asserted (indicating port $30_1$ is active), and MATCH(1) is deasserted (indicating the received source address does not match the stored MAC address in ADR(1)), and A(1) is asserted (indicating no lock), then the UPDATE(1) signal is asserted. Accordingly, the select OR gate 170 and the write OR gate 180 asserts the SELECT signal and the WRITE signal, respectively, to cause the received source address to be written into ADR(1). But if A(1) is set LOW indicating a lock, then the UPDATE(i) signal is deasserted and the ADR(1) will not be updated with the received source address.

An advantage of the preferred embodiment of the present invention is that it provides a network administrator with flexibility regarding network security. On repeater power up, all ports are programmed to allow updating of the corresponding ADR(x). This is the learning phase. After a predetermined amount of time has lapsed, or upon detection of an address change on port $30_x$, the administrator programs the managed repeater to lock the ADR(x) for port $30_x$. This is just one representative use of the preferred embodiment.

According to the present invention, the administrator has total flexibility as to when, and for which ports, to enable or disable the address learning. The administrator is able to program the address lock register A(x) in any way desired, on a per port basis. Once ADR(x) is locked, the administrator need not worry about servicing an interrupt flag in such a time-critical fashion as required by the prior art. Another advantage of the present invention is that it allows the network administrator, who already knows the MAC addresses connected to each port, to lock the stored MAC addresses with the address lock registers A(x) $160_x$, and then to program those MAC addresses into the ADR(x) memory locations.

Although the invention has been described in terms of a preferred embodiment, it will be obvious to those skilled in the art that various alternatives, modifications and equivalents may be made without departing from the invention.

Therefore, the above description should not be taken as limiting the scope of the invention which is defined by the appended claims.

What is claimed is:

1. In a managed repeater having an address learn capability wherein receipt at a particular port of a data packet having a received source address different from a stored source address associated with the particular port replaces the stored source address with the received source address, a source address locking circuit, comprising:

a learn mode circuit for the particular port, for replacing the stored source address with the received source address when the stored source address does not match the received source address; and an address lock register for the particular port, coupled to said learn mode circuit, for storing a bit value to prevent said learn mode circuit from replacing the stored source address with the received source address.

2. The source address locking circuit, as set forth in claim 1, wherein:

said address lock register is externally programmable to set a time for disabling said learn mode circuit.

3. In a managed repeater having a plurality of ports and having an address learn capability wherein receipt at a particular port of a data packet having a received source address different from a stored source address associated with the particular port replaces the stored source address with the received source address, a source address locking mechanism, comprising:

a plurality of learn mode circuits, one of said plurality of learn mode circuits corresponding to one of the plurality of ports, wherein each learn mode circuit replaces the stored source address with the received source address when the stored source address is different from the received source address and wherein the particular port associated with said learn mode circuit received the data packet; and a plurality of address lock registers, one of said plurality of address lock registers coupled to each learn mode circuit, for storing a bit value to prevent said learn mode circuit from replacing the stored source address with the received source address when the stored source address is different from the received source address and wherein the particular port associated with said learn mode circuit received the data packet.

4. The source address locking mechanism, as set forth in claim 3, wherein:

each of said address lock registers is independently and externally programmable to set a time for disabling said learn mode circuit associated with said address lock register.

5. The source address locking mechanism, as set forth in claim 3 wherein:

said learn mode circuit further selects between replacing the stored source address with the received source address or with the programmed source address for the particular port.

* * * * *